United States Patent
Naito

(10) Patent No.: US 12,314,955 B2
(45) Date of Patent: May 27, 2025

(54) FRAUD MONITORING DEVICE AND FRAUD MONITORING METHOD THEREFOR

(71) Applicant: TOSHIBA TEC KABUSHIKI KAISHA, Tokyo (JP)

(72) Inventor: Hidehiro Naito, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 205 days.

(21) Appl. No.: 18/077,014

(22) Filed: Dec. 7, 2022

(65) Prior Publication Data

US 2023/0410115 A1 Dec. 21, 2023

(30) Foreign Application Priority Data

May 25, 2022 (JP) .................................. 2022-085239

(51) Int. Cl.
*G06Q 20/40* (2012.01)
*G06V 20/52* (2022.01)

(52) U.S. Cl.
CPC ......... *G06Q 20/4016* (2013.01); *G06V 20/52* (2022.01)

(58) Field of Classification Search
CPC ................................................. G06Q 20/4016
See application file for complete search history.

(56) References Cited

U.S. PATENT DOCUMENTS

| 8,448,858 | B1 | 5/2013 | Kundu et al. |
| 2021/0097540 | A1 | 4/2021 | Sumpter et al. |
| 2022/0277299 | A1* | 9/2022 | Migdal .................. G06Q 20/38 |

FOREIGN PATENT DOCUMENTS

| JP | 2021-135620 | A | 9/2021 | |
| TW | I847099 | * | 7/2024 | ......... G06Q 30/0277 |

OTHER PUBLICATIONS

Agrawal, in "Integrating Digital Wallets: Advancements in Contactless Payment Technologies," from the International Journal of Intelligent Automation and Computing, 2021 (Year: 2021).*

Extended European Search Report dated Aug. 2, 2023, mailed in counterpart European Patent Application No. 23152593.2, 8 pages.

* cited by examiner

*Primary Examiner* — Olabode Akintola
*Assistant Examiner* — Brandon M Duck
(74) *Attorney, Agent, or Firm* — Kim & Stewart LLP

(57) ABSTRACT

According to an embodiment, a fraud monitoring device detects a possibility of a fraudulent act of a customer with respect to a payment terminal. The fraud monitoring device receives an instruction of verification completion for a possibility of a fraudulent act, the instruction being given by a salesclerk. Further, the fraud monitoring device prohibits payment processing of a payment terminal in which a possibility of a fraudulent act remains without receiving the instruction of verification completion.

7 Claims, 10 Drawing Sheets

FRAUD MONITORING DEVICE AND FRAUD MONITORING METHOD THEREFOR

CROSS-REFERENCE TO RELATED APPLICATIONS

This application is based upon and claims the benefit of priority from the prior Japanese Patent Application No. 2022-085239, filed on May 25, 2022, the entire contents of which are incorporated herein by reference.

FIELD

An embodiment described herein generally relates to a fraud monitoring device and a fraud monitoring method therefor.

BACKGROUND

A self-service POS terminal is a full-self-service payment terminal in which, in principle, a customer performs various operations from registration to payment of commodities to be purchased. In such a payment terminal, there is a possibility that a fraudulent act is performed, for example, a customer does not correctly register a commodity, which is added to a group of commodities to be purchased, as a commodity to be purchased. In this regard, the following operation has already been performed: actions of customers are imaged with a camera and the captured moving images are checked by a salesclerk or the like to verify whether or not a fraudulent act has been performed.

However, in some cases, it takes a long time for a salesclerk to find a fraudulent act of a customer from the moving images obtained by imaging the actions of the customers. For that reason, there have been cases where, even if a salesclerk finds a fraudulent act of a customer, the customer has already made a payment, and the fraud could not be corrected. In view of such circumstances, it has been desired to prevent a payment from being performed if there is a possibility of a fraudulent act with respect to an operation of a payment terminal.

DETAILED DESCRIPTION

Figure 1:
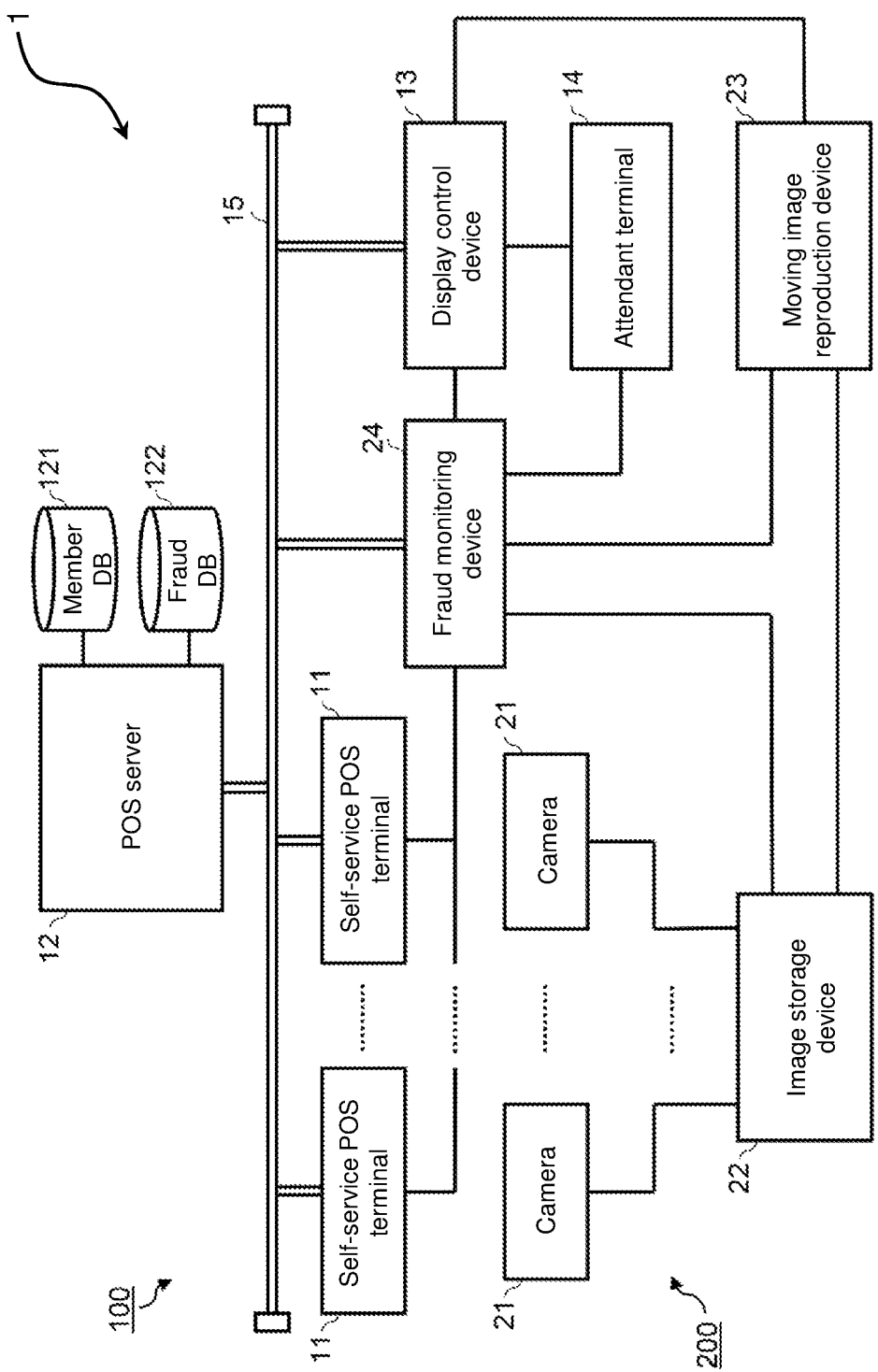
FIG. 1 is a configuration diagram showing a store system in which a self-service POS terminal according to an embodiment is provided.

According to one embodiment, a fraud monitoring device monitors a fraudulent act of a customer with respect to a payment terminal that performs payment processing according to operations of customers. The fraud monitoring device includes a communication interface and a processor. The communication interface communicates with external devices. The external devices include the payment terminal, an attendant terminal, and an image storage device. The attendant terminal reproduces a moving image for monitoring an operation of a customer with respect to the payment terminal and inputs an instruction of verification completion for a possibility of a fraudulent act of the customer, the instruction being given by an operation of a salesclerk. The image storage device stores image data output from an imaging device that images an action of the customer with respect to the payment terminal and generates image data. The processor acquires the image data stored in the image storage device via the communication interface. The processor recognizes the action of the customer with respect to the payment terminal on the basis of the acquired image data. The processor acquires a data signal from the payment terminal via the communication interface. The processor recognizes an operation of the customer with respect to the payment terminal on the basis of the acquired data signal. The processor detects a possibility of a fraudulent act of the customer with respect to the payment terminal on the basis of a recognition result of the action of the customer and a recognition result of the operation of the customer. The processor transmits information regarding the detection of the possibility of the fraudulent act of the customer to the attendant terminal via the communication interface. The processor receives the instruction of verification completion for the possibility of the fraudulent act of the customer, the instruction being given by the salesclerk, from the attendant terminal via the communication interface. Moreover, the processor confirms whether or not the possibility of the fraudulent act of the customer remains without receiving the instruction of verification completion, and prohibits payment processing of the payment terminal in which the possibility of the fraudulent act of the customer remains without receiving the instruction of verification completion.

Hereinafter, an embodiment of a fraud monitoring device will be described with reference to the drawings. The same reference symbols in the drawings will denote the same or similar portions. In this embodiment, a self-service POS terminal 11 (see FIG. 1) is an exemplary payment terminal. The embodiment exemplifies a fraud monitoring device 24 (see FIG. 1) that prevents the self-service POS terminal 11 from making a payment if there is a possibility of a fraudulent act with respect to the operation of the self-service POS terminal 11. Note that the possibility of a fraudulent act includes an act suspicious of being fraudulent, an act potentially fraudulent, and the like. First, a system configuration of a store including the fraud monitoring device 24 will be described.

[Description on Store System Configuration]

FIG. 1 is a configuration diagram showing a system 1 of a store in which the self-service POS terminal 11 is provided. The system 1 includes a self-service POS system 100 and a fraudulent-act monitoring system 200. The self-service POS system 100 includes a plurality of self-service POS terminals (payment terminals) 11, a POS server (payment server) 12, a display control device 13, an attendant terminal 14, and a communication network 15. The plurality of self-service POS terminals 11, the POS servers 12, and the display control device 13 are connected to the communication network 15. The attendant terminal 14 is connected to the display control device 13. The communication network 15 is typically a local area network (LAN). The LAN may be a wired LAN or a wireless LAN.

The self-service POS terminal 11 is a full-self-service payment terminal in which a customer performs an operation from registration to payment of a commodity to be purchased by himself/herself. In other words, the customer may be an operator of the self-service POS terminal 11. Note that a salesclerk may also be an operator on behalf of a customer.

The POS server 12 is a payment server computer for centrally controlling the operations of the respective self-service POS terminals 11. Under the control of the POS server 12, the self-service POS terminals 11 perform registration processing, payment processing, and the like for commodities to be purchased under the same conditions.

The POS server 12 manages a member database 121 and a fraud database 122. The member database 121 is a collection of member data created for each member of the store. The member is, for example, a known reward-point member. The member data includes a unique member ID set for each member in order to individually identify members. Further, the member data includes cumulative reward points held by the member, the number of times of visit, and the like. Each member owns a member card in which his or her member ID is recorded. Alternatively, the member installs application software exclusively for members on an information terminal such as a smartphone. When the application software is activated, a barcode or a two-dimensional code indicating the member ID is displayed on the display device of the information terminal.

The fraud database 122 is a collection of fraud data created each time a salesclerk recognizes a fraudulent act with respect to the operation of the self-service POS terminal 11. The fraud data includes a date and time when a fraudulent act is recognized, a checkout counter number, which is identification information of the self-service POS terminal 11 in which a fraudulent act is recognized, and the like. If the operator of the self-service POS terminal 11 is a member, the fraud data also includes the member ID of the member. The fraud data may include comments input via the attendant terminal 14.

The display control device 13 is a controller that creates monitoring images for each of the self-service POS terminals 11 on the basis of data signals related to the payment processing, the data signals being output from the respective self-service POS terminals 11, and the like, and causes the display device of the attendant terminal 14 to display the monitoring images. The attendant terminal 14 is a terminal for a salesclerk, called an attendant, to monitor the status of each self-service POS terminal 11 on the basis of the monitoring images. Details of the attendant terminal 14 and the monitoring images will be described later.

The fraudulent-act monitoring system 200 includes a plurality of cameras 21, an image storage device 22, a moving image reproduction device 23, and a fraud monitoring device 24. Further, the fraudulent-act monitoring system 200 uses the attendant terminal 14.

The plurality of cameras 21 correspond to the plurality of self-service POS terminals 11 on a one-to-one basis. The camera 21 is for imaging an operator who operates a corresponding self-service POS terminal 11. The image data imaged by the camera 21 is moving image data representing the behavior of the operator. Thus, for example, a video camera having a function of capturing a moving image is used as the camera 21. The camera 21 is an example of an imaging device.

The image storage device 22 stores the image data output from each camera 21 in a built-in storage device in association with a checkout counter number of the self-service POS terminal 11 corresponding to each camera 21. As the image storage device 22, a large-capacity storage device such as a solid state drive (SSD) or a hard disc drive (HDD) can be used alone or in combination.

The moving image reproduction device 23 is a device that reproduces a moving image based on the image data stored in the image storage device 22. The moving image reproduced by the moving image reproduction device 23 is displayed on the attendant terminal 14 under the control of the display control device 13.

The fraud monitoring device 24 connects the plurality of self-service POS terminals 11, the display control device 13, the attendant terminal 14, the image storage device 22, and the moving image reproduction device 23 to each other. The fraud monitoring device 24 is a device that monitors operators who operate the self-service POS terminals 11, notifies a salesclerk of a possibility of a fraudulent act via the attendant terminal 14 when a possibility of a fraudulent act is recognized, and prompts the salesclerk to verify the possibility of the fraudulent act. Further, the fraud monitoring device 24 is also a device that prohibits payment processing in the self-service POS terminal 11 that has not been verified as to the possibility of the fraudulent act.

Figure 2:
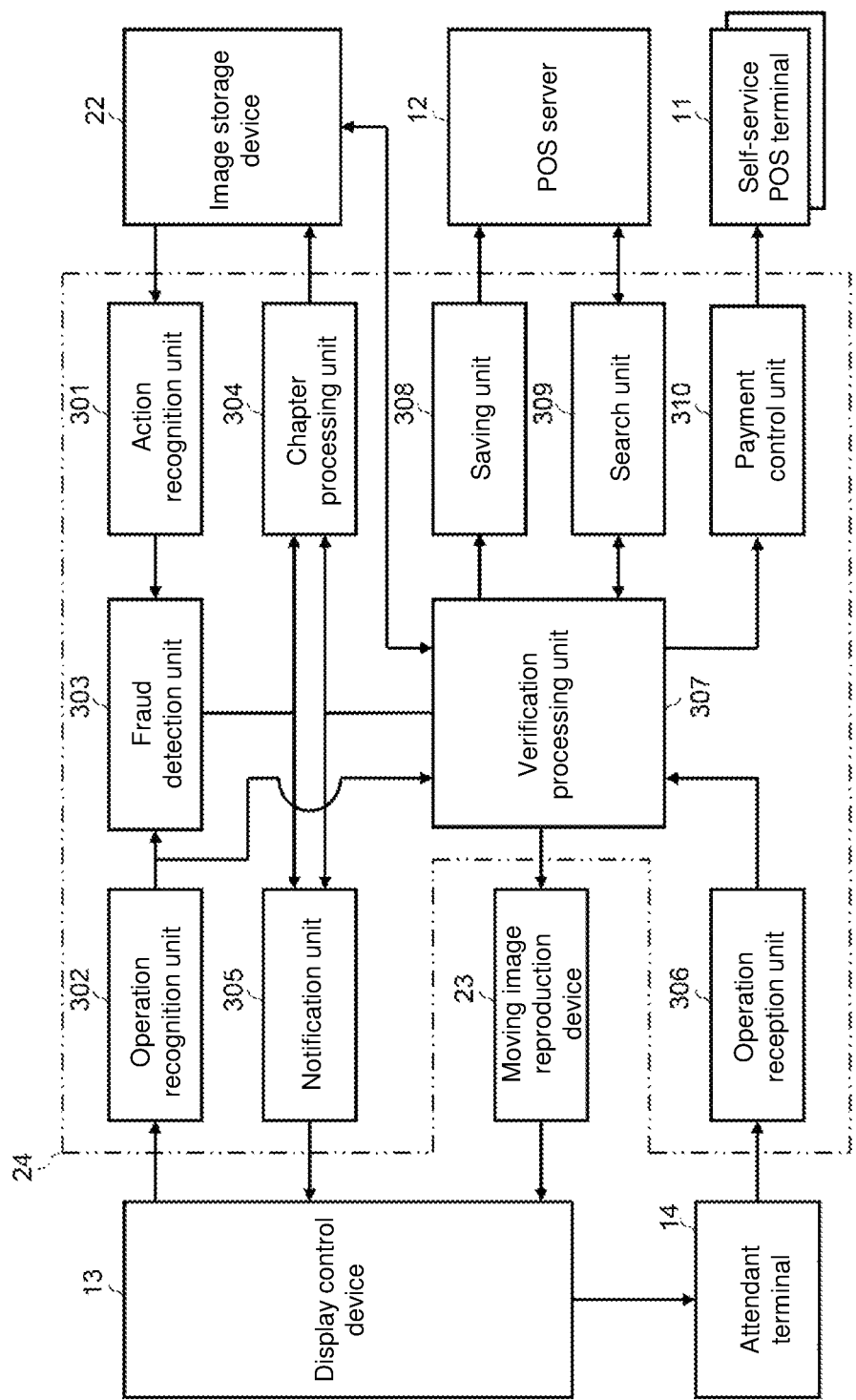
FIG. 2 is a block diagram showing a main functional configuration of a fraud monitoring device according to the embodiment.

FIG. 2 is a block diagram showing a main functional configuration of the fraud monitoring device 24. The fraud monitoring device 24 has functions as an action recognition unit 301, an operation recognition unit 302, a fraud detection unit 303, a chapter processing unit 304, a notification unit 305, an operation reception unit 306, a verification processing unit 307, a saving unit 308, a search unit 309, and a payment control unit 310.

The action recognition unit 301 recognizes an action of a customer with respect to the self-service POS terminal 11 on the basis of the image data stored in the image storage device 22. The operation recognition unit 302 recognizes an operation of the customer with respect to the self-service POS terminal 11 on the basis of the data signal input from each self-service POS terminal 11 to the display control device 13. The fraud detection unit 303 detects a possibility of a fraudulent act of the customer operating the self-service POS terminal 11 on the basis of the recognition result by the action recognition unit 301 and the recognition result by the operation recognition unit 302. Here, the action recognition unit 301, the operation recognition unit 302, and the fraud detection unit 303 constitute fraud detection means for detecting a possibility of a fraudulent act of an operator with respect to the self-service POS terminal 11.

The chapter processing unit 304 adds a chapter (section) to the image data of the operator, the image data being captured by a camera 21 corresponding to the self-service POS terminal 11, at the time when the fraud detection unit 303 detects a possibility of a fraudulent act with respect to the self-service POS terminal 11. The chapter is given to a portion corresponding to the imaging time of the moving image, at which the possibility of the fraudulent act is detected. The fraud monitoring device 24 can cause the attendant terminal 14 to display a moving image of a total of 20 seconds, for example, 10 seconds before and after the imaging time to which the chapter is given, as a moving image for fraudulent act verification. Here, the chapter processing unit 304 constitutes recording means for recording a chapter that makes it possible to identify the range of the image data in which the possibility of the fraudulent act (for example, an act or action suspected of fraud) detected by the fraud detection unit 303 appears.

The notification unit 305 notifies the salesclerk of the possibility of the fraudulent act via the attendant terminal 14 when the fraud detection unit 303 detects the possibility of the fraudulent act. The salesclerk confirms that the possibility of the fraudulent act has been detected through this notification, views a moving image for verification related to the possibility of the fraudulent act, and then verifies whether or not the fraudulent act has actually occurred. Here, the notification unit 305 constitutes notification means for notifying that the fraud detection unit 303 has detected a possibility of a fraudulent act.

The operation reception unit 306 receives an operation input by the salesclerk to the attendant terminal 14. For example, if a possibility of a fraudulent act is detected, the salesclerk performs an operation input for instructing the attendant terminal 14 to verify the possibility of the fraudulent act. After verifying the possibility of the fraudulent act through the moving image for verification or the like displayed on the attendant terminal 14, the salesclerk performs an operation input on the attendant terminal 14 in order to notify the fraud monitoring device 24 of the verification result. Here, the operation reception unit 306 constitutes reception means for receiving an instruction indicating that the possibility of the fraudulent act has been verified.

The verification processing unit 307 performs various types of processing related to the verification of the possibility of the fraudulent act according to the operation input received by the operation reception unit 306 (the operation input by the salesclerk to the attendant terminal 14). For example, upon receiving the above-mentioned operation input for instructing the verification of the possibility of the fraudulent act, the verification processing unit 307 performs processing for causing the attendant terminal 14 to reproduce the moving image for fraudulent act verification on the basis of the image data stored in the image storage device 22.

For example, upon receiving the operation input indicating the verification result of the possibility of the fraudulent act (the operation input by the salesclerk to the attendant terminal 14), the verification processing unit 307 performs processing for notifying the chapter processing unit 304 and the notification unit 305 of verification completion. In response to the notification, the chapter processing unit 304 removes the chapter added to the portion of the image data, in which the possibility of the fraudulent act has been detected. The notification unit 305 notifies the salesclerk of the verification completion of the possibility of the fraudulent act.

For example, upon receiving the operation input indicating that the verification result of the possibility of the fraudulent act shows the presence of a fraudulent act (the operation input by the salesclerk to the attendant terminal 14), the verification processing unit 307 performs processing for creating fraud data. As described above, if the operator of the self-service POS terminal 11 is a member, the fraud data includes the member ID for identifying that member. The saving unit 308 saves the fraud data created by the verification processing unit 307 in the fraud database 122. Here, the verification processing unit 307 and the saving unit 308 constitute saving means for saving the information related to the operator who has received an instruction indicating the presence of a fraudulent act by the reception means.

The search unit 309 searches the member database 121 and the fraud database 122 using the member ID as a search key, and provides the detected member data and fraud data to the verification processing unit 307. The verification processing unit 307 performs information processing for outputting, to the attendant terminal 14, member information necessary for the verification of the possibility of the fraudulent act, on the basis of the member data and fraud data provided from the search unit 309. The member information includes the number of times of visit of the member and the number of pieces of fraud data of the member. Here, the search unit 309 and the verification processing unit 307 constitute output means for outputting the information of the operator saved by the saving means.

When detecting that an operation input for shifting to payment in the self-service POS terminal 11 is performed in response to a data signal output from the self-service POS terminal 11 to the display control device 13, the verification processing unit 307 confirms whether or not the verification operation for the possibility of the fraudulent act detected in that self-service POS terminal 11 remains. Specifically, if a chapter is added to the image data stored in the image storage device 22 in association with the checkout counter number of the self-service POS terminal 11, the verification processing unit 307 determines that the verification operation for the possibility of the fraudulent act remains. Further, if a chapter is not added to the image data, the verification processing unit 307 determines that the verification operation for the possibility of the fraudulent act does not remain. The payment control unit 310 allows the payment processing in the self-service POS terminal 11 for which the verification processing unit 307 determines that the verification operation for the possibility of the fraudulent act does not remain. The payment control unit 310 prohibits the payment processing in the self-service POS terminal 11 for which the verification processing unit 307 determines that the verification operation for the possibility of the fraudulent act remains. Here, the verification processing unit 307 and the payment control unit 310 constitute prohibition means for prohibiting the payment processing of the self-service POS terminal 11 in which a fraud remains without receiving an instruction of verification completion.

[Description on Positional Relationship Between Self-Service POS Terminal and Camera]

Figure 3:
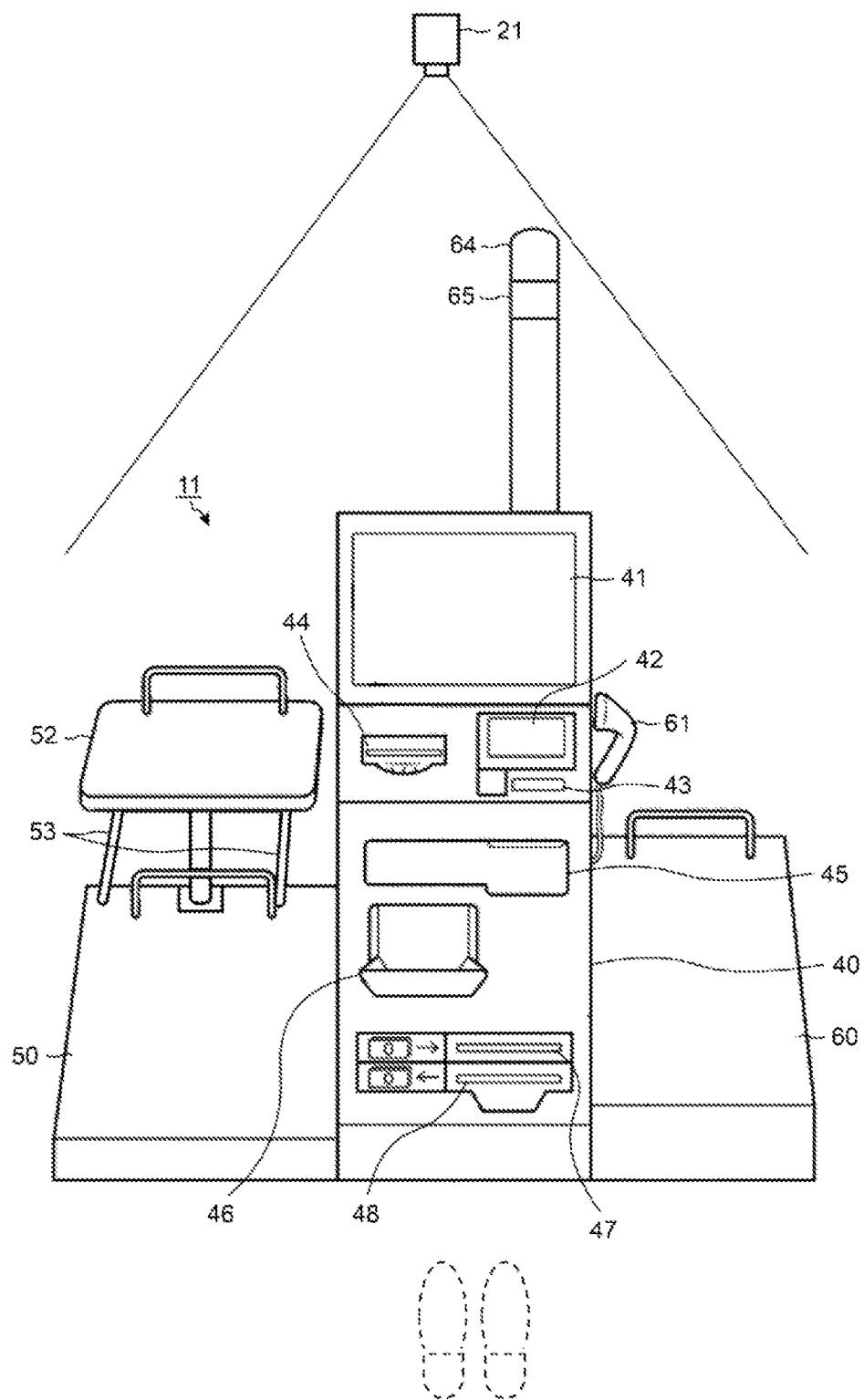
FIG. 3 is a diagram for describing a positional relationship between the self-service POS terminal and a camera according to the embodiment.

FIG. 3 is a diagram for describing the positional relationship between the self-service POS terminal 11 and the camera 21. First, the external configuration of the self-service POS terminal 11 will be described.

The self-service POS terminal 11 includes a main body 40 installed on a floor surface and a bagging table 50 installed beside the main body 40. The main body 40 includes a touch panel 41 attached to an upper portion thereof. The touch panel 41 includes a display and a touch sensor. The touch panel 41 is an example of a display unit. The display is a device for displaying various screens to an operator who operates the self-service POS terminal 11. The touch sensor is a device for detecting a touch input to a screen by the operator. In the self-service POS terminal 11, the operator is usually a customer.

The main body 40 includes a basket table 60 provided at the center portion on the side surface opposite to the side where the bagging table 50 is installed. The basket table 60 is for placing a basket or the like in which a customer coming from a sales hall has put a commodity to be purchased. The customer performs operations while standing on the front side of the main body 40 in FIG. 3 so as to view the screen of the touch panel 41. Thus, as viewed from the customer, the basket table 60 is on the right side and the bagging table 50 is on the left side with the main body 40 interposed therebetween. In this embodiment, the side where the customer stands are the front of the main body 40, the side where the bagging table 50 is installed is the left side of the main body 40, and the side where the basket table 60 is provided is the right side of the main body 40.

The main body 40 includes a scanner, a card reader, a receipt printer, a cash processor, and the like. The main body 40 includes a scanner reading window 42, a card insertion port 43, a receipt issuing port 44, a coin depositing port 45, a coin payout port 46, a bill depositing port 47, and a bill payout port 48 on the front side of the main body. Further, a communication cable extends from the right side surface of the main body 40 to the outside, and a handy scanner 61 is connected to the distal end of the communication cable. Although not shown in the figure, a reader/writer for an electronic money medium is also provided in the main body 40.

A display pole 64 is attached to the upper surface of the main body 40. The display pole 64 includes a light emitting portion 65 at a distal end portion thereof. The light emitting portion 65 selectively emits blue or red light, for example. The display pole 64 displays the status of the self-service POS terminal 11 by the light emission color of the light emitting portion 65, for example, a standby state, an operating state, a calling state, an error state, a fraudulent act occurring state, and the like. The display pole 64 may display the status of the self-service POS terminal 11 by blinking of the light emitting portion 65.

The bagging table 50 has a structure in which a bag holder 52 is attached to an upper portion thereof. The bag holder 52 includes a pair of holding arms 53. The holding arms 53 hold a shopping bag provided in the store, a shopper brought by a customer, so-called customer's own bag, or the like.

Next, the positional relationship between the self-service POS terminal 11 and the camera 21 will be described. As shown in FIG. 3, the camera 21 is installed at a position where a customer who stands in front of the self-service POS terminal 11 and confronts components such as the main body 40, the bagging table 50, and the basket table 60 can be imaged from above.

The customer who stands in front of the self-service POS terminal 11 first places a basket or the like, in which commodities to be purchased are put, on the basket table 60 on the right side, and causes the holding arms 53 on the left side to hold a shopping bag, a customer's own bag, or the like. Next, the customer operates the touch panel 41 in accordance with a guidance displayed on the touch panel 41 to declare that the use of the self-service POS terminal 11 is started.

Subsequently, the customer takes out the commodities to be purchased one by one from the basket placed on the basket table 60. If a barcode is attached to the commodity to be purchased, the customer passes the barcode over the reading window 42 and causes the scanner to read the barcode, thus performing commodity registration. If a barcode is not attached to the commodity to be purchased, the customer operates the touch panel 41 to select the commodity to be purchased from a list of commodities without barcode, thus performing commodity registration. The customer puts the commodity to be purchased, which has been registered, into the shopping bag, the customer's own bag, or the like.

The customer who has registered all the commodities to be purchased operates the touch panel 41 to declare the payment of the commodities to be purchased, and selects a payment method. For example, if cash payment is selected, the customer deposits bills or coins into the bill depositing port 47 or the coin depositing port 45, and takes out the change paid out from the bill payout port 48 or the coin payout port 46. For example, if electronic money payment is selected, the customer passes an electronic money medium over the reader/writer. For example, if credit card payment is selected, the customer inserts a credit card into the card insertion port 43. Thus, when the payment is completed, the customer receives a receipt issued from the receipt issuing port 44, and leaves the store with the shopping bag or customer's own bag removed from the holding arms 53.

The camera 21 is installed at a position where the movement of the hand of the customer acting as described above in front of the self-service POS terminal 11 can be imaged.

[Description of Attendant Terminal and Monitoring Image]

Figure 4:
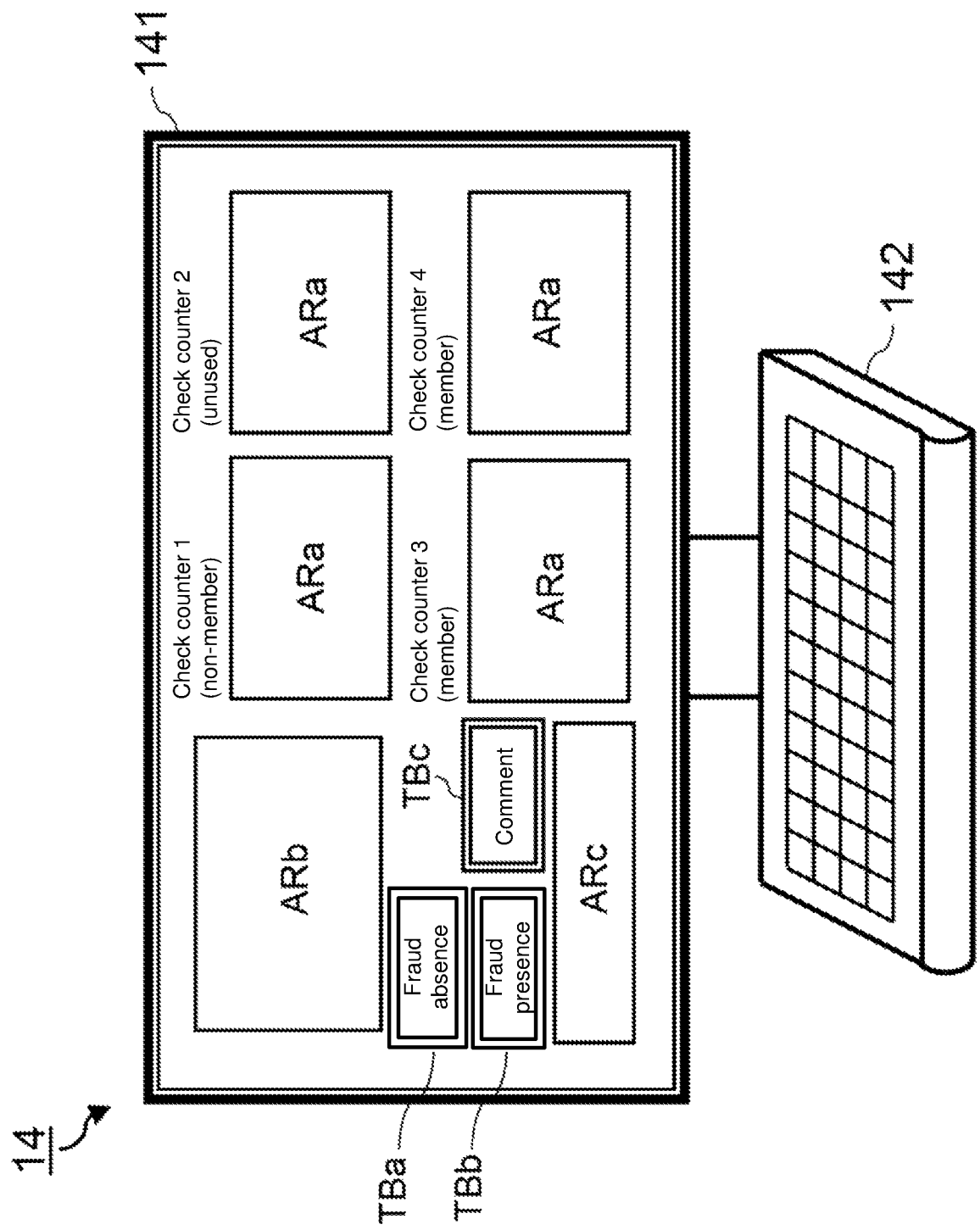
FIG. 4 is a schematic diagram showing a schematic configuration of an attendant terminal according to the embodiment.

FIG. 4 is a schematic diagram showing a schematic configuration of the attendant terminal 14. The attendant terminal 14 includes a touch-panel display 141 and a keyboard 142 for inputting a text. The screen of the display 141 includes a plurality of (four in FIG. 4) monitoring image areas ARa, a moving image verification area ARb, and a text area ARc. Further, a fraud absence button TBa, a fraud presence button TBb, and a comment button TBc are disposed between the moving image verification area ARb and the text area ARc.

The moving image verification area ARb is an area in which a moving image for fraudulent act verification is reproduced. The fraud absence button TBa is a button image touched by a salesclerk who is an operator of the attendant terminal 14 when the salesclerk recognizes the absence of a fraudulent act from the moving image or the like reproduced in the moving image verification area ARb. The fraud presence button TBb is a button image touched by the salesclerk when the salesclerk recognizes the presence of a fraudulent act from the moving image or the like reproduced in the moving image verification area ARb. The comment button TBc is a button image touched by the salesclerk when the salesclerk needs to enter a comment. By touching the comment button TBc, the salesclerk can enter a text to be a comment from the keyboard 142. The entered text is displayed in the text area ARc. In addition, the above-mentioned member information is also displayed in the text area ARc.

Each of the plurality of monitoring image areas ARa corresponds to one self-service POS terminal 11. Therefore, FIG. 4 shows an example in which the monitoring image areas ARa respectively correspond to the four self-service POS terminals 11. For example, if the attendant terminal 14 corresponds to six self-service POS terminals 11, six monitoring image areas ARa are displayed on the display 141.

Figure 5:
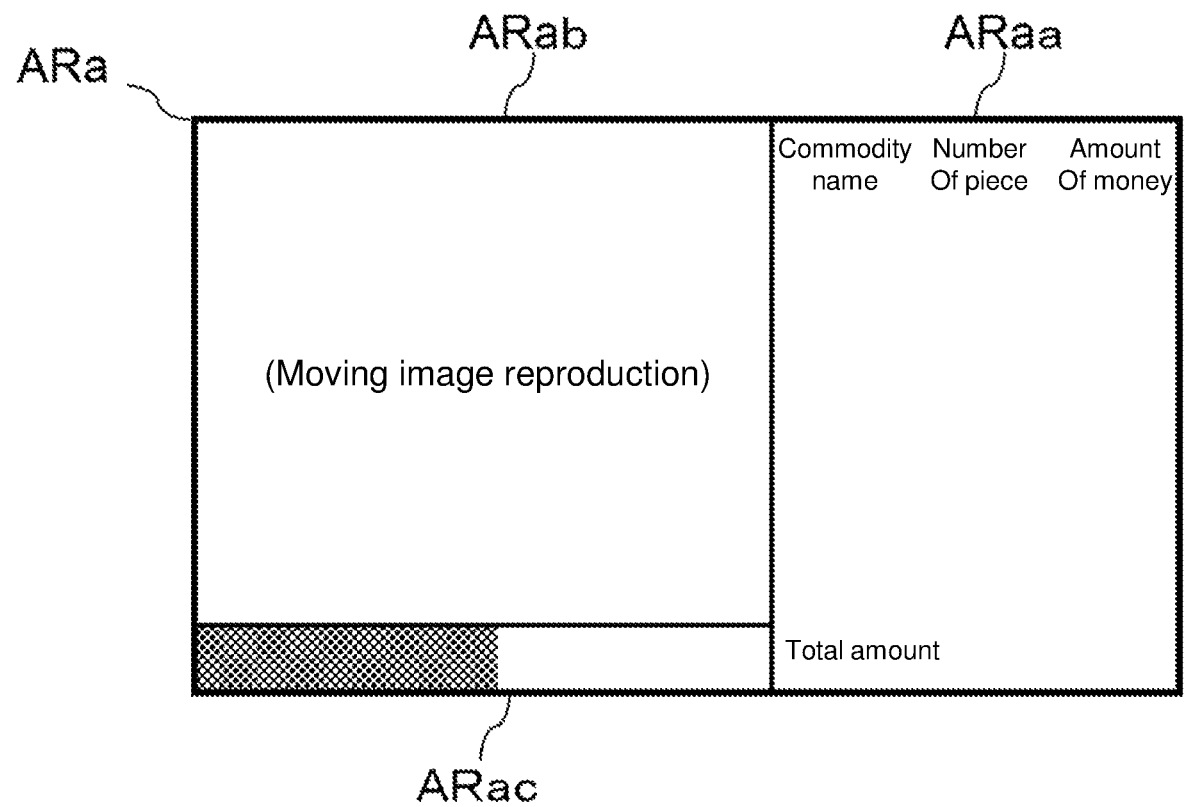
FIG. 5 is a schematic diagram showing an example of a monitoring image displayed on a display device of the attendant terminal according to the embodiment.

As shown in FIG. 5, the monitoring image area ARa is divided into a registered description area ARaa, a moving image reproduction area ARab, and a progress status bar area ARac. The registered description area ARaa is an area for displaying commodity names, the number of pieces, the amount of money, the total amount, and the like of the commodities to be purchased, which are registered in a corresponding self-service POS terminal 11. The moving image reproduction area ARab is an area for reproducing a moving image captured by the camera 21 provided to the corresponding self-service POS terminal 11. The progress status bar area ARac is an area for displaying a bar indicating the progress of the moving image reproduced in the moving image reproduction area ARab.

The image displayed in the monitoring image area ARa is controlled by the display control device 13. In other words, in the registered description area ARaa, the information of the commodities to be purchased is displayed on the basis of the data signal output from the self-service POS terminal 11 to the display control device 13. In the moving image reproduction area ARab, the moving image of the operator who operates the self-service POS terminal 11 is reproduced on the basis of the image data output from the moving image reproduction device 23 to the display control device 13.

[Description of Configuration of Fraud Monitoring Device]

Figure 6:
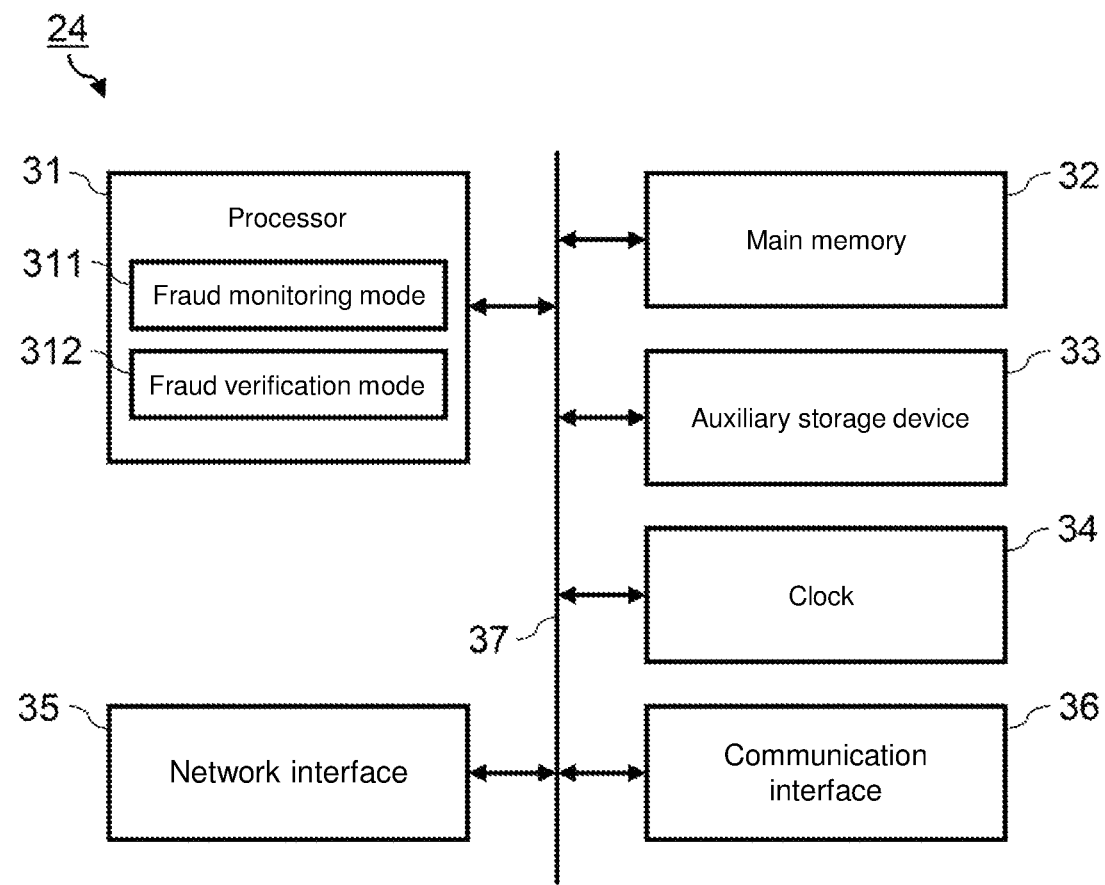
FIG. 6 is a block diagram showing a main circuit configuration of the fraud monitoring device according to the embodiment.

FIG. 6 is a block diagram showing a circuit configuration of a main part of the fraud monitoring device 24. The fraud monitoring device 24 includes a processor 31, a main memory 32, an auxiliary storage device 33, a clock 34, a network interface 35, a communication interface 36, and a system transmission path 37. The system transmission path 37 includes an address bus, a data bus, and the like. The fraud monitoring device 24 constitutes a computer by connecting the processor 31, the main memory 32, the auxiliary storage device 33, the clock 34, the network interface 35, and the communication interface 36 to each other via the system transmission path 37.

The processor 31 corresponds to a central part of the computer. The processor 31 controls each unit to implement various functions as the fraud monitoring device 24 in accordance with an operating system or an application program. The processor 31 is, for example, a central processing unit (CPU).

The main memory 32 corresponds to a main storage portion of the computer. The main memory 32 includes a non-volatile memory area and a volatile memory area. The main memory 32 stores the operating system or application program in the non-volatile memory area. The main memory 32 stores data necessary for the processor 31 to execute processing for controlling each unit in the volatile memory area. This type of data may be stored in the non-volatile memory area. The volatile memory area of the main memory 32 is used by the processor 31 as a work area in which data is appropriately rewritten. The non-volatile memory area is, for example, a read only memory (ROM). The volatile memory area is, for example, a random access memory (RAM).

The auxiliary storage device 33 corresponds to an auxiliary storage portion of the computer. As the auxiliary storage device 33, a well-known storage device such as a solid state drive (SSD), a hard disc drive (HDD), or an electric erasable programmable read-only memory (EEPROM) may be used alone or in combination of them. The auxiliary storage device 33 stores data used by the processor 31 to perform various types of processing, data generated in processing by the processor 31, and the like. The auxiliary storage device 33 may store the application program.

The clock 34 functions as a time information source of the fraud monitoring device 24. The processor 31 acquires the current date and time on the basis of the time information counted by the clock 34.

The network interface 35 is an interface for performing data communication with the POS server 12 and the like via the communication network 15. The fraud monitoring device 24 can perform data communication with the POS server 12 via the network interface 35 to access the member database 121 and the fraud database 122 managed by the POS server 12.

The communication interface 36 is an interface for communicating with the units of each self-service POS terminal 11, the display control device 13, the attendant terminal 14, the image storage device 22, and the moving image reproduction device 23.

In the fraud monitoring device 24 having such a configuration, the processor 31 has the operation modes of a fraud monitoring mode 311 and a fraud verification mode 312 in order to implement the functions of the action recognition unit 301, the operation recognition unit 302, the fraud detection unit 303, the chapter processing unit 304, the notification unit 305, the operation reception unit 306, the verification processing unit 307, the search unit 309, the saving unit 308, and the payment control unit 310 described above. Those operation modes are in accordance with a control program, which is a kind of application program stored in the main memory 32 or the auxiliary storage device 33.

The method of installing the control program in the main memory 32 or the auxiliary storage device 33 is not particularly limited. The control program can be installed in the main memory 32 or the auxiliary storage device 33 by recording the control program on a removable recording medium or distributing the control program by communication via a network. The recording medium may have any form such as a CD-ROM or a memory card, as long as the recording medium can store a program and an apparatus can read it.

[Description on Operation of Fraud Monitoring Mode]

Figure 7:
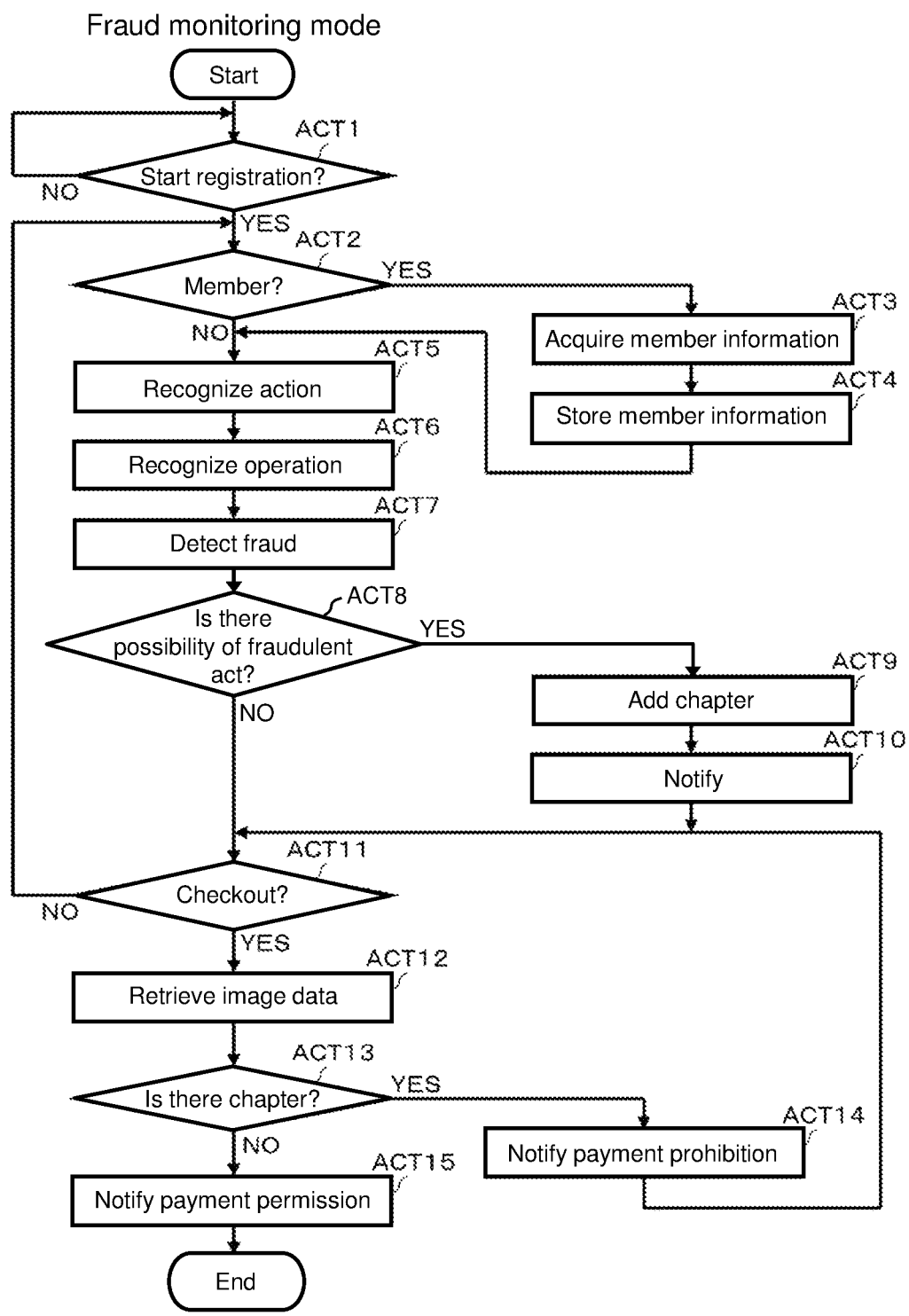
FIG. 7 is a flowchart showing information processing according to a fraud monitoring mode of a processor of the fraud monitoring device according to the embodiment.

FIG. 7 is a flowchart showing information processing according to the fraud monitoring mode of the processor 31 for a single self-service POS terminal 11. The processor 31 can also perform the information processing according to the fraud monitoring mode on another self-service POS terminal 11 in parallel in a similar manner.

The processor 31 starts the information processing in the procedure shown in the flowchart of FIG. 7 for the self-service POS terminal 11 in the standby state. In ACT1, the processor 31 waits until a registration start operation for commodities to be purchased is performed in the self-service POS terminal 11 by determining whether a registration start signal is input from the display control device 13 via the communication interface 36.

An initial screen including a start key is displayed on the touch panel 41 of the self-service POS terminal 11 in the standby state. A customer who has finished shopping at the sales floor moves to the front of a free self-service POS terminal 11 and places a basket or the like, in which the commodities to be purchased are put, on the basket table 60. The customer then touches the start key of the initial screen. When the start key is touched, the self-service POS terminal 11 outputs a registration start signal to the display control device 13. When it is determined that a registration start signal is input from the display control device 13 via the communication interface 36 (YES in ACT1), the processing of the processor 31 proceeds to ACT2. In ACT2, the processor 31 confirms whether or not member registration (the registration of the member ID) is performed by the customer who has touched the start key.

The customer who is a member causes the card reader of the self-service POS terminal 11 to read data of a member card, for the registration of the member ID. Alternatively, the customer causes the scanner of the self-service POS terminal 11 to read a barcode or two-dimensional code indicating the member ID displayed on a display device of a smartphone or the like, for the registration of the member ID. The customer as a member performs either one of the above operations, so that the self-service POS terminal 11 outputs a data signal including the member ID to the display control device 13. In ACT2, the processor 31 determines whether or not member registration (the registration of the member ID) has been performed by the customer. Specifically, the processor 31 determines whether or not a data signal including the member ID has been input from the display control device 13 via the communication interface 36. The processor 31 determines that the member registration (the registration of the member ID) has been performed by the customer when a data signal including the member ID is received.

If it is determined that the member registration (the registration of the member ID) has been performed by the customer (YES in ACT2), the processing of the processor 31 proceeds to ACT3. In ACT3, the processor 31 searches the member database 121 and the fraud database 122 by the function of the search unit 309. The processor 31 detects member data of the member identified by the member ID from the member database 121. Further, if there is fraud data of the member identified by the member ID in the fraud database 122, the processor 31 detects the fraud data. The processor 31 then acquires member information including the number of times of visit of the member and the number of pieces of fraud data of the member. In ACT4, the processor 31 stores the member information in the main memory 32 in association with the checkout counter number of the corresponding self-service POS terminal 11. On the other hand, if it is determined that the member registration (the registration of the member ID) has not been performed by the customer (NO in ACT2), the processing of the processor 31 skips the processing in ACT3 and ACT4 and proceeds to ACT5.

In ACT5, the processor 31 recognizes an action of the customer with respect to the self-service POS terminal 11 by the function of the action recognition unit 301. Further, in ACT6, the processor 31 recognizes an operation of the customer with respect to the self-service POS terminal 11 by the function of the operation recognition unit 302. Subsequently, in ACT7, the processor 31 detects a possibility of a fraudulent act of the customer who operates the self-service POS terminal 11 on the basis of the action recognition result and the operation recognition result by the function of the fraud detection unit 303.

In the self-service POS terminal 11 in which the start key is touched, the screen of the touch panel 41 shifts from the initial screen to a registration screen. The customer confirms the shift to the registration screen and then performs an operation to register commodities to be purchased on the self-service POS terminal 11. Specifically, the customer takes out one item of the commodities to be purchased from the basket or the like placed on the basket table 60. If a barcode is attached to the commodity to be purchased, the customer passes the barcode over the reading window 42 of the scanner. If a barcode is not attached to the commodity to be purchased, the customer selects the commodity to be purchased from a list of barcode-free commodities displayed on the screen of the touch panel 41. If the barcode passed over the reading window 42 is correctly read by the scanner or the commodity to be purchased is selected from the list of barcode-free commodities, registered commodity data is output from the self-service POS terminal 11 to the display control device 13. The registered commodity data includes a commodity name, the number of commodities, the amount of money, and the like of the commodity to be purchased. The display control device 13 controls display of an image in the monitoring image area ARa of the attendant terminal 14 on the basis of the registered commodity data. The information of the commodity to be purchased is displayed in the registered description area ARaa of the monitoring image area ARa of the attendant terminal 14. In such a manner, the customer finishes the registration of the first item of the commodities to be purchased, and puts the commodity to be purchased in a shopping bag, a customer's own bag, or the like prepared on the bagging table 50. The customer then shifts to the operation of registering the second item of the commodities to be purchased.

In response to such a registration operation of the commodities to be purchased, the processor 31 of the fraud monitoring device 24 recognizes, by the function of the action recognition unit 301, an operation of the customer taking out the commodities to be purchased from the basket table 60 (take-out operation), and an operation of the customer putting the commodities to be purchased into a shopping bag, a customer's own bag, or the like (bagging operation). Further, the processor 31 detects the registered commodity data output from the self-service POS terminal 11 to the display control device 13 by the function of the operation recognition unit 302, and recognizes the registration operation for the commodities to be purchased. The processor 31 detects a possibility of a fraudulent act by the function of the fraud detection unit 303 if the processor 31 fails to recognize a registration operation for the commodities to be purchased between the take-out operation and the bagging operation. In other words, if the customer bags the commodities taken out from the basket table 60 without registering the commodities in the self-service POS terminal 11, the processor 31 of the fraud monitoring device 24 detects a possibility of a fraudulent act.

After the processing of ACT7, the processing of the processor 31 process to ACT8. The processor 31 determines whether or not a possibility of a fraudulent act has been detected in ACT8. If it is determined that a possibility of a fraudulent act has not been detected (NO in ACT8), the processing of the processor 31 proceeds to ACT11.

If it is determined that a possibility of a fraudulent act has been detected (YES in ACT8), the processing of the processor 31 proceeds to ACT9. In ACT9, by the function of the chapter processing unit 304, the processor 31 adds a chapter to the image data captured at the time when the possibility of the fraudulent act is detected.

The image data is stored in the image storage device 22 in association with the checkout counter number of the self-service POS terminal 11 corresponding to the camera 21. The moving image based on the image data is reproduced in the moving image reproduction area ARab of the monitoring image area ARa corresponding to the self-service POS terminal 11 identified by the checkout counter number. The processor 31 adds a chapter to the image data corresponding to the moving image being reproduced in the moving image reproduction area ARab at the time when the possibility of the fraudulent act is detected. In addition, in ACT10, the processor 31 notifies the salesclerk of the fact that the possibility of the fraudulent act has been detected from the attendant terminal 14 by the function of the notification unit 305. After that, the processing of the processor 31 proceeds to ACT11.

Figure 9:
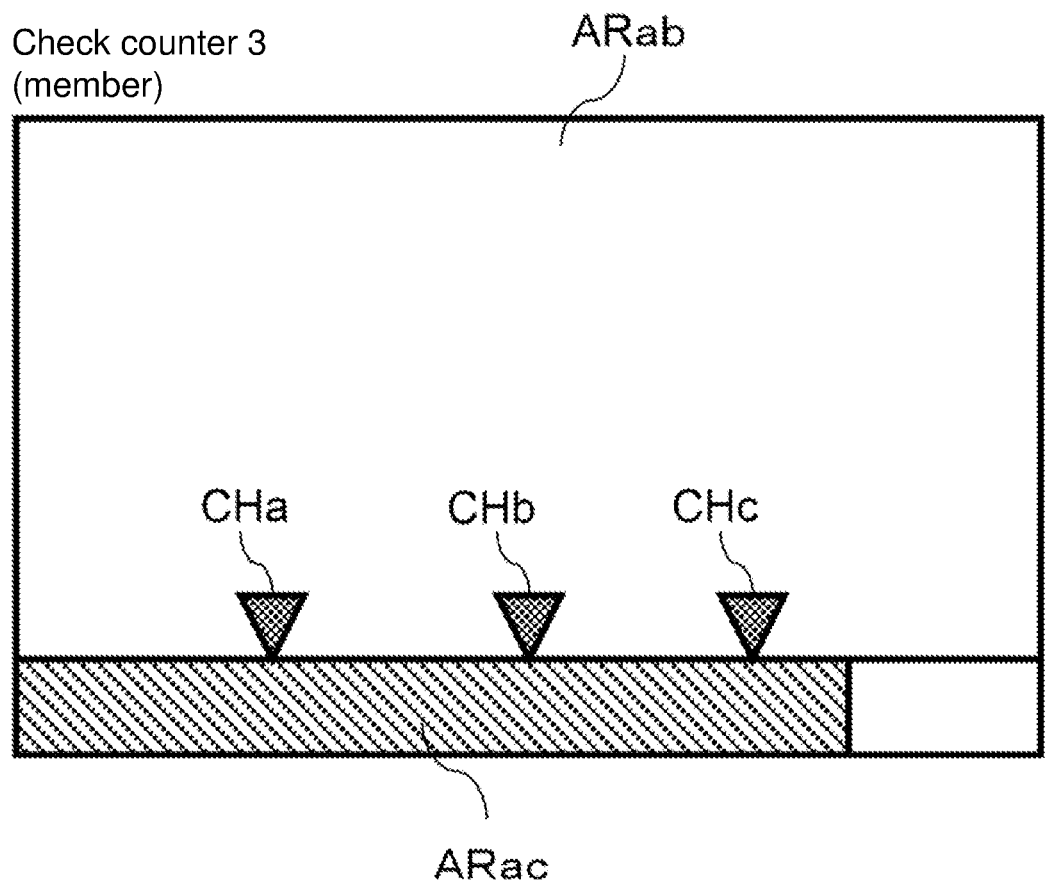
FIG. 9 is a schematic diagram showing a moving image reproduction area and a progress status bar area of a monitoring image area before performing fraudulent act verification according to the embodiment.

FIG. 9 is a schematic diagram showing the moving image reproduction area ARab and the progress status bar area ARac of the monitoring image area ARa for the self-service POS terminal 11 in which a possibility of a fraudulent act is detected. In the progress status bar area ARac, a bar indicating the progress status of the moving image reproduced in the moving image reproduction area ARab is displayed. The bar extends from the left end to the right end in FIG. 9 with the elapse of the moving image reproduction time. When chapters are added to the image data, chapter marks CHa, CHb, and CHc are displayed at those points in time. FIG. 9 shows a case where a first possibility of a fraudulent act is detected at a first time point at which the chapter mark CHa is displayed, a second possibility of a fraudulent act is detected at a second time point at which the chapter mark CHb is displayed, and a third possibility of a fraudulent act is detected at a third time point at which the chapter mark CHc is displayed. As described above, the display of the chapter marks CHa, CHb, and CHc notifies the salesclerk of the fact that possibilities of fraudulent acts have been detected.

Incidentally, the chapter marks CHa, CHb, and CHc are displayed in a first color, for example, red. When the chapter is removed after being verified and the absence of a fraudulent act is confirmed in the processing of the fraud verification mode to be described later, the chapter marks CHa, CHb, and CHc are displayed in a second color, for example, blue.

Figure 10:
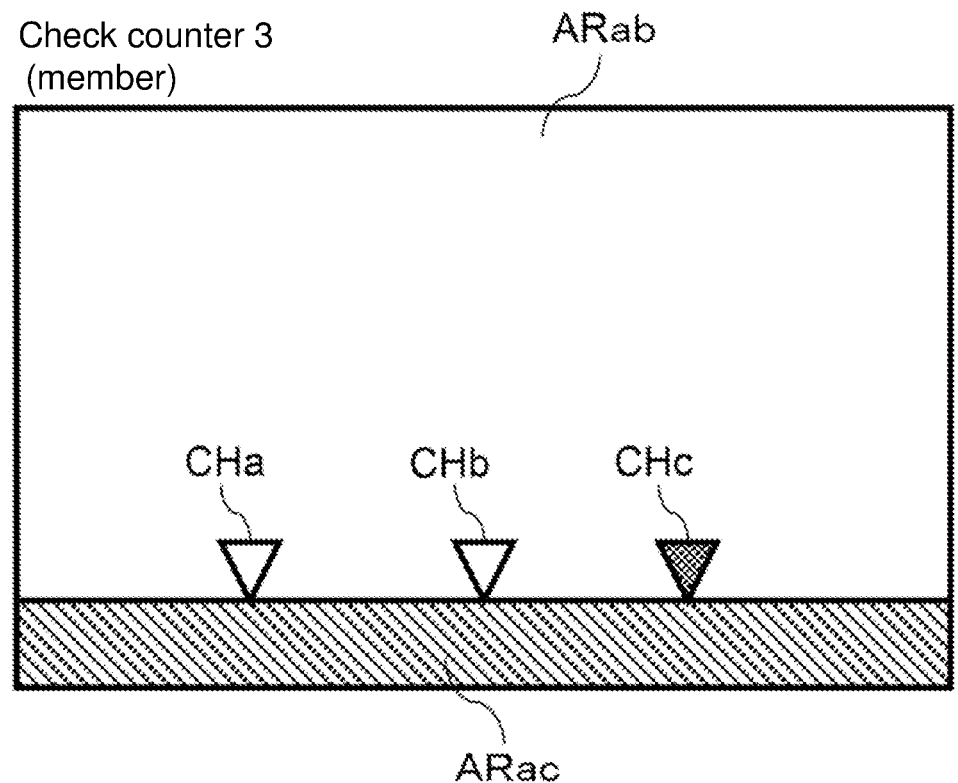
FIG. 10 is a schematic diagram showing the moving image reproduction area and the progress status bar area of the monitoring image area after performing fraudulent act verification according to the embodiment.

FIG. 10 shows a case where the possibility of the fraudulent act corresponding to the chapter mark CHa and the possibility of the fraudulent act corresponding to the chapter mark CHb are verified and it is determined that there are no fraudulent acts. Further, FIG. 10 shows a case where the possibility of the fraudulent act corresponding to the chapter mark CHc has not been verified or it is determined that there is a fraudulent act. As described above, the salesclerk can know whether or not the possibility of the fraudulent act has been detected and whether or not the possibility of the fraudulent act has been verified on the basis of the color of the chapter marks CHa, CHb, and CHc. Note that the salesclerk may also be able to recognize whether or not the possibility of the fraudulent act has been verified on the basis of a difference in shape, a difference between lighting and blinking, and the like, rather than the difference in color of the chapter marks CHa, CHb, and CHc.

Now, the description of FIG. 7 will be continued. If it is determined in ACT8 that the possibility of the fraudulent act has not been detected, or if the processing of Act9 and ACT10 has been executed because the possibility of the fraudulent act has been detected, the processing of the processor 31 proceeds to ACT11. In ACT11, the processor 31 determines whether or not the operation to instruct checkout has been performed in the self-service POS terminal 11. Specifically, it is determined whether or not a checkout command signal is output from the self-service POS terminal 11 to the display control device 13.

The customer who has finished the registration operation of all the commodities to be purchased touches a payment key displayed on the registration screen. When the payment key is touched, the self-service POS terminal 11 outputs a checkout command signal to the display control device 13. If it is determined that the checkout command signal has been detected (YES in ACT11), the processing of the processor 31 proceeds to ACT12. On the other hand, if it is determined that the checkout command signal has not been detected (NO in ACT11), the processing of the processor 31 returns to ACT2. The processor 31 then executes the processing of ACT2 to ACT11 in the same manner as described above.

The processor 31, which has detected the checkout command signal, retrieves the image data of the self-service POS terminal 11 in ACT12. In ACT13, the processor 31 determines whether or not a chapter is added to the image data. If it is determined that a chapter is added to the image data (YES in ACT13), the processing of the processor 31 proceeds to ACT14. In ACT14, the processor 31 outputs a payment prohibition signal to the self-service POS terminal 11 by the function of the payment control unit 310. In the self-service POS terminal 11 that has received the payment prohibition signal from the fraud monitoring device 24, the payment processing is prohibited.

After the processing of ACT14, the processing of the processor 31 returns to ACT11. Therefore, the payment processing of the self-service POS terminal 11 is prohibited while the chapter is added to the image data.

On the other hand, if it is determined that a chapter is not added to the image data (NO in ACT13), the processing of the processor 31 proceeds to ACT15. In ACT15, the processor 31 outputs a payment permission signal to the self-service POS terminal 11 by the function of the payment control unit 310. In the self-service POS terminal 11 that has received the payment permission signal from the fraud monitoring device 24, the payment processing can be performed. Upon completion of the processing of ACT15, the processor 31 terminates the information processing shown in the flowchart of FIG. 7.

[Description on Operation of Fraud Verification Mode]

Figure 8:
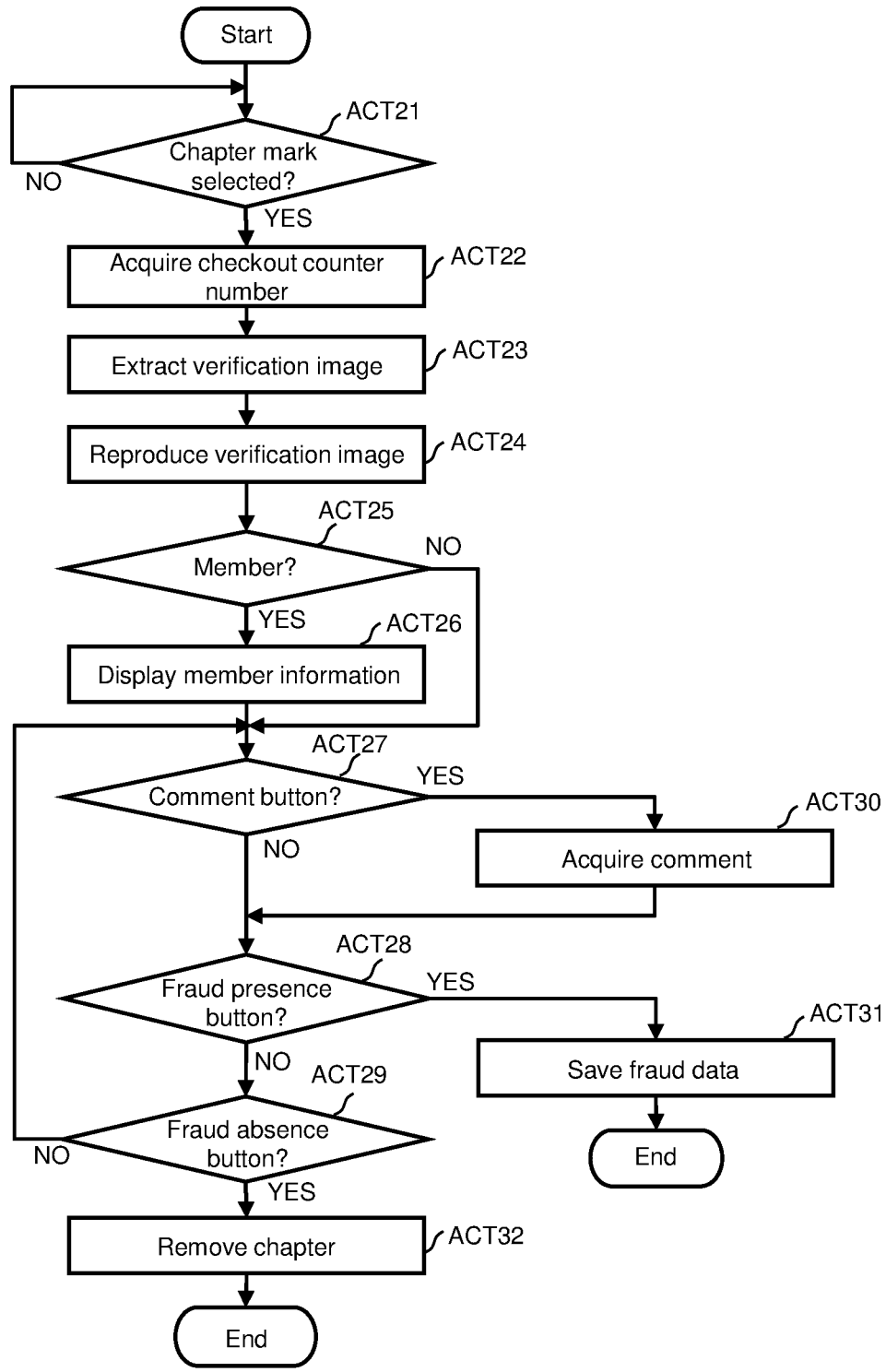
FIG. 8 is a flowchart showing information processing according to a fraud verification mode of the processor of the fraud monitoring device according to the embodiment.

FIG. 8 is a flowchart showing information processing according to the fraud verification mode of the processor 31 for a single self-service POS terminal 11. The processor 31 can also execute the information processing according to the fraud verification mode for another self-service POS terminal 11 in parallel in the same manner.

The processor 31 starts the information processing shown in the flowchart of FIG. 8 for the self-service POS terminal 11 in which a possibility of a fraudulent act is detected. In ACT21, the processor 31 determines whether or not a chapter mark has been selected and operated by the function of the operation reception unit 306. By performing this determination, the processor 31 waits for the chapter mark to be selected and operated.

When confirming that the chapter mark is displayed in the progress status bar area ARac of the monitoring image area ARa, the salesclerk of the attendant terminal 14 recognizes that a possibility of a fraudulent act has been detected with respect to the self-service POS terminal 11 corresponding to that monitoring image area ARa. The salesclerk performs a selection operation of touching the chapter mark in order to verify the possibility of the fraudulent act.

If it is determined that the chapter mark has been selected and operated (YES in ACT21), the processing of the processor 31 proceeds to ACT22. In ACT22, by the function of the verification processing unit 307, the processor 31 acquires a checkout counter number of the self-service POS terminal 11 corresponding to the monitoring image area ARa (see FIG. 4) in which the selected chapter mark is displayed. In ACT23, the processor 31 extracts image data to be a moving image for fraudulent act verification from the image data stored in the image storage device 22 in association with the checkout counter number. In other words, the processor 31 extracts, for example, image data for 10 seconds before and after the imaging time to which the chapter corresponding to the selected chapter mark is added. In ACT24, the processor 31 then reproduces the moving image for fraudulent act verification based on the extracted image data in the moving image verification area ARb (see FIG. 4).

In ACT25, the processor 31 determines whether or not the operator (customer) of the self-service POS terminal 11 identified by the checkout counter number is a member. If it is determined that the operator is a member (YES in ACT25), the processing of the processor 31 proceeds to ACT26. In ACT26, the processor 31 displays the member information of the member in the text area Arc (see FIG. 4). The member information is information stored in the main memory 32 in ACT4 of the processing in the fraud monitoring mode described above. If it is determined that the customer who is the operator is not a member (NO in ACT25), the processing of the processor 31 skips the processing of ACT26 and proceeds to ACT27.

In this way, when a salesclerk touches a chapter mark in order to verify the possibility of the fraudulent act, for example, a moving image of 10 seconds before and after the imaging time to which the chapter corresponding to the chapter mark is added is reproduced as a moving image for fraudulent act verification in the moving image verification area ARb. This moving image is a moving image indicating the action of the operator at the time when the possibility of the fraudulent act is detected in the self-service POS terminal 11. Further, if the customer who is the operator is a member, for example, the number of times of visit and the number of pieces of fraud data are also displayed in the text area ARc as the member data.

In this regard, the salesclerk views the moving image reproduced in the moving image verification area ARb and verifies whether or not a fraudulent act has actually been performed. In this case, if the member information is displayed in the text area ARc, such member information is also referred to. For example, although it is difficult to determine whether or not a fraudulent act has been performed from the moving image, if the operator is a member who has come to the store more than 100 times and has the number of pieces of fraud data of zero, the operator is a member with high credibility, so that the salesclerk recognizes that there is no fraudulent act. Therefore, since it is not necessary to verify the moving image in detail, it is possible to shorten the time required for the verification. Conversely, if the operator is a member who has a small number of times of visit, a member who was found to perform a fraudulent act in the past, or a non-member, the salesclerk verifies the moving image in detail. At that time, if it is difficult to determine whether or not a fraudulent act has been performed, the salesclerk may go to the operator for confirmation.

As a consequence of such verification, if it is recognized that there is no fraudulent act, the salesclerk touches the fraud absence button TBa. If it is recognized that there is a fraudulent act, the salesclerk touches the fraud presence button TBb. In addition, for example, when an operator who is recognized as performing a fraudulent act is a non-member, it is desired to leave the characteristics of the operator as a comment. In such a case, the salesclerk touches the comment button TBc to enter a comment from the keyboard 142.

In ACT27, the processor 31 waits for the comment button TBc to be operated by determining whether or not the comment button TBc has been operated. Further, in ACT28, the processor 31 waits for the fraud presence button TBb to be operated by determining whether or not the fraud presence button TBb has been operated. In ACT29, the processor 31 waits for the fraud absence button TBa to be operated by determining whether or not the fraud absence button TBa has been operated. If it is determined that the comment button TBc has been operated (YES in ACT27) in those standby states, the processing of the processor 31 proceeds to ACT30. In ACT30, the processor 31 acquires, as a comment, a text input by a key operation using the keypad 142. Subsequently, the processor 31 waits for the fraud presence button TBb or the fraud absence button TBa to be operated.

If it is determined that the fraud presence button TBb is operated in the standby states of ACT27 to ACT29 (YES in ACT28), the processing of the processor 31 proceeds to ACT31. In ACT31, the processor 31 creates fraud data and saves the fraud data in the fraud database 122. The processor 31 then terminates the processing of the fraud verification mode for the possibility of the fraudulent act identified by the selected chapter mark. In other words, in this case, the chapter mark remains without being removed from the image data.

If it is determined that the fraud absence button TBa is operated in the standby states of ACT27 to ACT29 (YES in ACT29), the processing of the processor 31 proceeds to ACT32. In ACT32, the processor 31 removes the chapter, which has been added when the possibility of the fraudulent act identified by the selected chapter mark is detected, from the image data. The processor 31 then terminates the processing of the fraud verification mode.

[Description of Effects of Fraud Monitoring Device]

As described above in detail, the fraud monitoring device 24 is provided in the store in which the self-service POS terminal 11 is provided, so that the following operational effects can be obtained.

In other words, if there is a possibility of a fraudulent act with respect to the operation of the self-service POS terminal 11, the moving image for fraudulent act verification is reproduced by the attendant terminal 14. Therefore, the salesclerk can verify whether or not a fraudulent act has actually been performed by viewing the moving image. As a result of the verification, in the self-service POS terminal 11 recognized as having no fraudulent act, the payment processing is allowed. On the other hand, in the self-service POS terminal 11 in which the possibility of the fraudulent act has not been verified or a fraudulent act has been recognized, the payment processing is prohibited. Therefore, if there is a possibility of a fraudulent act regarding the operation of the self-service POS terminal 11, it is possible to prevent the payment from being performed. As a result, if the salesclerk finds a fraudulent act of a customer, the fraud can be certainly corrected.

[Modification]

In the embodiment described above, the fraud detection unit 303 detects a possibility of a fraudulent act of an operator who operates the self-service POS terminal 11 on the basis of the recognition result by the action recognition unit 301 and the recognition result by the operation recognition unit 302. For example, the fraud detection unit 303 may detect a possibility of a fraudulent act when detecting that the operator has performed a suspicious action from the image captured by the camera 21. Further, the fraud detection unit 303 may detect a possibility of a fraudulent act of the operator by using information other than the image.

When the fraud detection unit 303 detects a possibility of a fraudulent act, the notification unit 305 may notify the salesclerk of the detection by using an information terminal such as a smartphone or tablet terminal carried by the salesclerk.

The payment control unit 310 prohibits the payment processing of the self-service POS terminal 11 in which the chapter mark remains, which has not received at least an instruction indicating the absence of a fraudulent act. In this regard, if the possibility of the fraudulent act has already been verified, the payment processing of the self-service POS terminal 11 may be allowed regardless of whether or not there is a fraudulent act.

In the embodiment described above, the case where the customer who is the operator is identified by using the member ID has been exemplified. In this regard, the customer may be identified by, for example, using characteristic data of the appearance such as the face of the operator imaged by the camera 21. This makes it possible to identify a customer and leave fraud data even when the customer is a non-member.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fraud monitoring system, comprising:
   a self-service point-of-sales (POS) terminal including a first table and a second table, and a scanner disposed between the first table and the second table;
   an imaging device associated with the self-service POS terminal and configured to capture an image of a check-out region including the first table, the second table, and the scanner and generate image data of the captured image;
   an attendant terminal;
   an image storage device that stores the image data generated by the imaging device;
   a moving image reproduction device that reproduces a moving image on a basis of the image data stored in the image storage device;
   a display control device that creates a monitoring image for the self-service POS terminal on a basis of a data signal related to product registration using the self-service POS and the image data generated by the imaging device, and causes the attendant terminal to display the monitoring image; and
   a fraud monitoring device configured to detect a potential fraudulent act of a customer during the product registration, wherein
   the fraud monitoring device includes
      a network interface that performs data communication via a communication network with a server that controls payment processing of the self-service POS terminal,
      a communication interface that communicates with the self-service POS terminal, the attendant terminal, the image storage device, the moving image reproduction device, and the display control device, and
      a processor configured to
         detect a first customer act to place a product on the first table and a second customer act to place the product on the second table,
         detect the possible fraudulent act of the customer based on presence or non-presence of product registration of the product by the self-service POS terminal between the first customer act and the second customer act,
         attach, to the image data stored in the image storage device, a chapter at a timing corresponding to the possible fraudulent act and transmit information regarding the detection of the possible fraudulent act to the display control device via the communication interface to thereby notify the attendant terminal of the detection of the possible fraudulent act via the display control device,
         cause the moving image reproduction device to reproduce a moving image at the timing corresponding to the possible fraudulent act based on the image data stored in the image storage device,
         cause the attendant terminal to display the moving image and perform verification of the possible fraudulent act using the displayed moving image, the verification including removal of the chapter from the image data stored in the image storage device, and
         upon an operation to proceed to the payment processing on the self-service POS terminal, determine whether or not any chapter is attached to the image data stored in the image storage device, and disable the payment processing when determining that any chapter is attached to the image data.

2. The fraud monitoring system according to claim 1, wherein
   the fraud monitoring system includes a plurality of self-service POS terminals and a plurality of imaging devices associated with the self-service POS terminals, respectively, and
   the display control device creates the monitoring image for each of the payment terminals, and causes the attendant terminal to display the monitoring image for each of the self-service POS terminals.

3. The fraud monitoring system according to claim 1, wherein the processor is configured to
   extract image data at the timing corresponding to the possible fraudulent act from the image data stored in the image storage device, and
   cause the moving image reproduction device to reproduce the moving image based on the extracted image data.

4. The fraud monitoring system according to claim 1, wherein the server manages a database for fraudulent act information about customers having history of fraudulent acts.

5. The fraud monitoring system according to claim 4, wherein, the processor is configured to, upon the possible fraudulent act being verified as being fraudulent, transmit information related to the customer to the server via the communication interface to thereby store the information related to the customer in the database.

6. The fraud monitoring system according to claim 4, wherein the processor is configured to
   retrieve fraudulent act information associated with the customer from the fraudulent act information stored in the database managed by the server, and
   cause the attendant terminal to display the retrieved fraudulent act information.

7. The fraud monitoring system according to claim 1, wherein the processor is configured to, upon detection of a plurality of possible fraudulent acts of the customer, attach, to the image data stored in the image storage device, a plurality of chapters at a timing corresponding to the possible fraudulent act and transmit information regarding the detection of the possible fraudulent acts to the display control device via the communication interface to thereby notify the attendant terminal of the detection of the possible fraudulent acts via the display control device.

* * * * *